United States Patent [19]

Alletto et al.

[11] Patent Number: 5,065,798
[45] Date of Patent: Nov. 19, 1991

[54] STRETCHED STRAP CABLE TIE TENSIONING AND SEVERING TOOL

[75] Inventors: John S. Alletto, Frankfort; Maurice M. Maurer, Elmhurst, both of Ill.

[73] Assignee: Panduit Corp., Tinley Park, Ill.

[21] Appl. No.: 646,968

[22] Filed: Jan. 28, 1991

[51] Int. Cl.⁵ .............................................. B21F 9/02
[52] U.S. Cl. .................................... 140/123.6; 83/658
[58] Field of Search ........................... 140/93.2, 123.6; 83/658

[56] References Cited

U.S. PATENT DOCUMENTS

| 3,661,187 | 5/1972 | Caveney et al. | |
| 3,830,263 | 8/1974 | Benfer. | |
| 3,837,252 | 9/1974 | Brassel | 83/658 |
| 4,119,124 | 10/1978 | Collier et al. | 140/123.6 |

Primary Examiner—Lowell A. Larson
Attorney, Agent, or Firm—Charles R. Wentzel; Mark D. Hilliard

[57] ABSTRACT

A stretched strap cable tie tensioning and severing tool includes a means for positioning a cable tie strap between a severance blade and an anvil and means for moving the severance blade completely through the strap and into engagement with the anvil to sever the strap, wherein the anvil is formed of a ductile metallic material and wherein the blade is of a greater hardness than the anvil sufficient to allow the blade to penetrate the anvil to form a groove therein.

6 Claims, 1 Drawing Sheet

STRETCHED STRAP CABLE TIE TENSIONING AND SEVERING TOOL

BACKGROUND OF THE INVENTION

The present invention relates generally to hand tools having a mechanism to withdraw the strap of a cable tie away from the head of the cable tie to tension the cable tie around an object and to sever the strap adjacent the head of the cable tie when a predetermined tension is reached in the cable tie. Specifically the present invention relates to a cable tie tensioning and severing tool that is specially designed to reliably and repeatedly sever the straps of cable ties that have been stretched to longitudinally orient the nylon strap material.

Prior tools of a design similar to the present invention are illustrated by U.S. Pat. Nos. 3,661,187 and 3,830,263. These tools were designed for the application of molded nylon cable ties that were not stretched to orient the plastic straps of the ties.

The tool of U.S. Pat. No. 3,661,187 severed the strap of a cable tie by selectively pivoting a linkage to force a blade through the thickness of the tie strap and just prior to the complete severance of the strap releasing the force applied to the blade to withdraw the blade. The blade of the tool notches the strap allowing the relatively soft strap to yield under the tensioning force applied by the tool to completely sever the strap.

The tool of U.S. Pat. No. 3,830,263 severed the strap of a cable tie by selectively driving a cutting blade through the strap of a cable tie against an anvil.

A commercial tool with a mechanism similar to the mechanism of U.S. Pat. No. 3,661,187 utilizes an elastomeric cord blade stop disposed in the path of a cutting blade such that after the blade has severed the strap the blade engages the elastomeric cord to prevent further translation of the blade into engagement with a metal surface of the tool.

A commercially desirable cable tie application tool must be able to tension and cleanly sever thousands of cable tie straps before replacement of its severance blade is necessary. The use of prior tools to tension and sever stretch oriented cable ties has not proven satisfactory. Stretch oriented cable ties are produced by heating the strap of each molded nylon cable tie and stretching the strap to increase its length and decrease its cross sectional area. The stretching of the strap of the tie results in a tough, hard and relatively more brittle cable tie strap that requires increased force to sever the strap.

The use of a tool that does not completely sever the stretched strap while supporting it against an anvil has been found to result in a brittle fraying of the stretched strap of the tie leaving an unacceptable jagged sharp edge to the severed strap. Also the severance blade of prior anvil tools, when driven by the higher force necessary to sever a stretched strap, is quickly dulled by repeated contact with the hard metal anvil of prior tools.

SUMMARY OF THE INVENTION

One of the objects of the present invention is the provision of an improved cable tie tensioning and severing tool that is specially adapted to sever stretch oriented cable ties.

Another object of the present invention is the provision of an improved cable tie tensioning and severing tool that can sever stretched strap cable ties without excessive degradation of the cutting edge of the severing blade.

In general a stretched strap cable tie tensioning and severing tool includes a means for positioning a cable tie strap between a severance blade and an anvil and means for moving the severance blade completely through the strap and into engagement with the anvil to sever the strap, wherein the anvil is formed of a ductile metallic material and wherein the blade is of a greater hardness than the anvil sufficient to allow the blade to penetrate the anvil to form a groove therein.

DESCRIPTION OF THE PREFERRED EMBODIMENT

A stretched strap cable tie tensioning and severing tool embodying the concept of the present invention is designated generally by the numeral 10 in the accompanying drawings. The actuation mechanism for tensioning and severing the cable tie strap is only partially shown in FIGS. 1 and 2, the details of its operation being explained in detail in U.S. Pat. No. 3,661,187 which is incorporated herein by reference.

Figure 1:
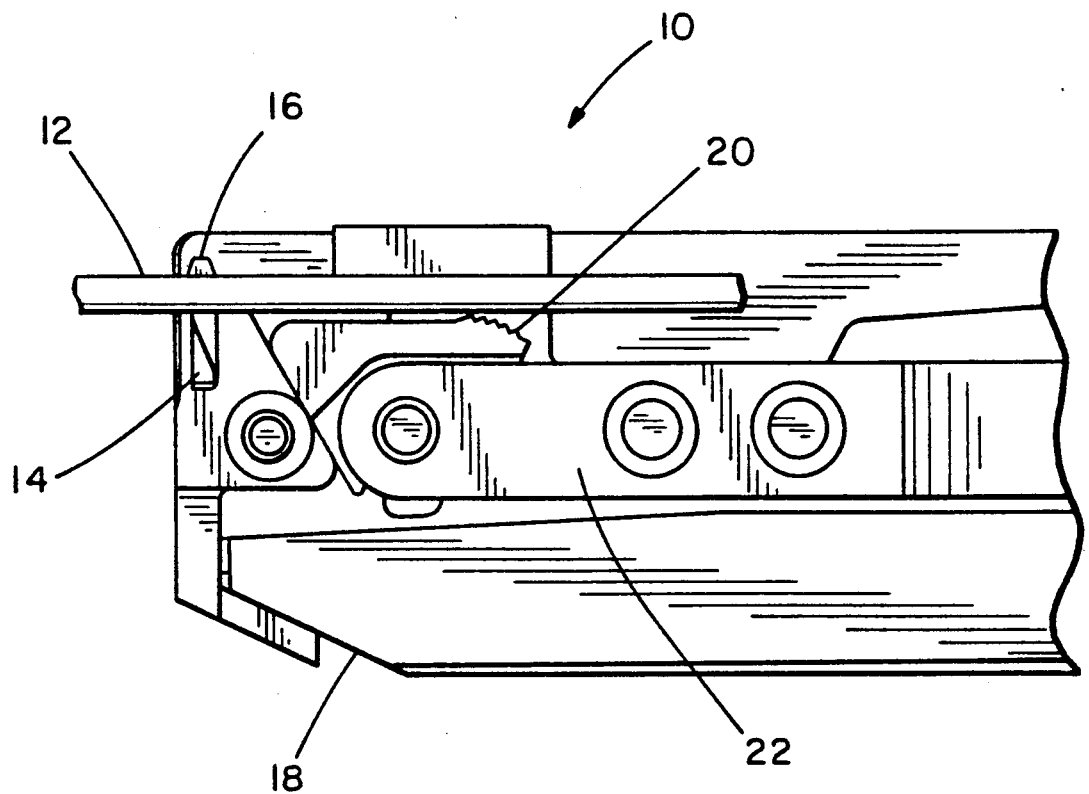
FIG. 1 is a fragmentary sectional view of the nose of a stretched strap cable tie tensioning and severing tool embodying the concept of the present invention showing the tool mechanism before actuation of the severance blade.

As seen in FIG. 1, strap 12 of a cable tie is positioned in tool 10 between a severance blade 14 and an anvil 16. A pivotal blade actuation linkage 18 the distal end of which is operatively connected to blade 14 by a link (not shown) is disposed to selectively pivot between a strap insertion position shown in FIG. 1 and a strap severance position shown in FIG. 2. A gripper pawl 20 is pivotally mounted at the distal end of a tension linkage 22 to selectively draw the cable tie strap inward to tension the cable tie.

Figure 2:
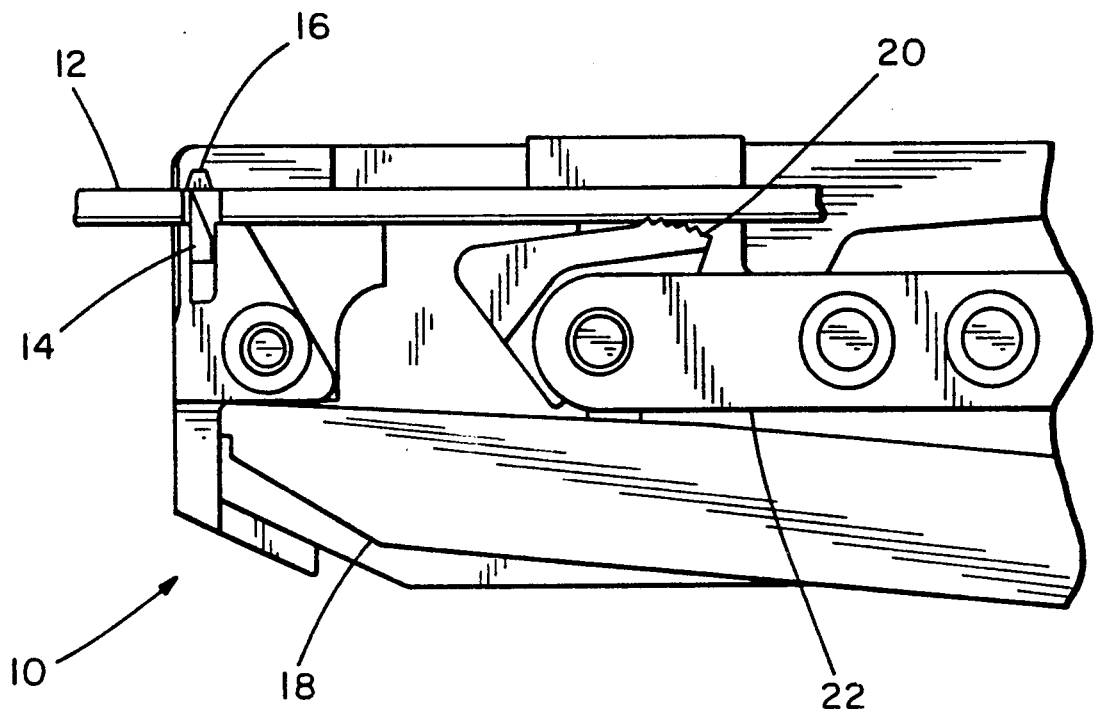
FIG. 2 is a fragmentary sectional view of the tool of FIG. 1 showing the position of the tool mechanism immediately after severance of the strap of the cable tie by the severance blade.

In operation, tool 10 withdraws strap 12, tensioning the cable tie (which in FIGS. 1 and 2 is only partially shown) until a predetermined tension is sensed by the tool mechanism which then actuates the linkage 18, pivoting the distal end of linkage 18 upwardly and driving blade 14 upwardly through strap 12 and into anvil 16 to sever strap 12.

Prior tools that do not utilize an anvil to support the cable tie strap when utilized to apply stretch oriented cable ties do not effectively sever the stretched strap, any thing less than complete blade penetration through the strap and against the anvil resulting in a splintering of the relatively more brittle stretched strap material. Prior tools that utilize a hard metal anvil quickly dull the cutting blade due to the greater force needed to penetrate the stretched strap and thus have an unacceptably short useful life.

Anvil 16 should be constructed of a ductile metallic material having a Brinell hardness of 80 to 125. The preferred material is a die cast zinc metal, UNS designation of Z33521, having a Brinell hardness of 82 in conjunction with a steel blade 14 having a hardness greater than the anvil 16 in a range of 50 to 60 Rockwell C. A yellow brass, 65 Cu, 35 Zn, anvil 16 having a Brinell hardness of 100 and an aluminum alloy, Alcad 2024-T6 having a Brinell hardness of 125 used in conjunction with the above blade 14 also exhibited satisfactory blade life and cutting effectiveness.

Blade 14 is preferably disposed relative to anvil 16 to form a slight groove in the softer zinc anvil after repeated cable tie applications by the tool.

We claim:

1. A cable tie application tool, comprising:
   means for positioning a cable tie strap between a severance blade and an anvil; and
   means for moving the severance blade completely through the strap and into engagement with the anvil to sever the strap, wherein the anvil is formed of a ductile metallic material and wherein the blade is of a greater hardness than the anvil sufficient to allow the blade to penetrate the anvil to form a groove therein.

2. A tool as set forth in claim 1, wherein the metallic material has a hardness of Brinell 80 to Brinell 125.

3. A tool as set forth in claim 2, wherein the metallic material is zinc.

4. A tool as set forth in claim 2, wherein the metallic material is brass.

5. A tool as set forth in claim 2, wherein metallic material is aluminum.

6. A tool as set forth in claim 2, wherein the severance blade is made of steel having a hardness in the range of 50 to 60 Rockwell C.

* * * * *